US005787388A

United States Patent [19]

Hayata

[11] Patent Number: 5,787,388

[45] Date of Patent: Jul. 28, 1998

[54] FRAME-COUNT-DEPENDENT SMOOTHING FILTER FOR REDUCING ABRUPT DECODER BACKGROUND NOISE VARIATION DURING SPEECH PAUSES IN VOX

[75] Inventor: Toshihiro Hayata, Tokyo, Japan

[73] Assignee: NEC Corporation, Tokyo, Japan

[21] Appl. No.: 666,124

[22] Filed: Jun. 21, 1996

[30] Foreign Application Priority Data

Jun. 30, 1995 [JP] Japan .................................... 7-165736

[51] Int. Cl.[6] ................................ H04B 14/00; G10L 9/14

[52] U.S. Cl. ............................ 704/215; 704/228; 704/264

[58] Field of Search ...................................... 704/215, 228, 704/264

[56] References Cited

U.S. PATENT DOCUMENTS

| | | | |
|---|---|---|---|
| 5,475,712 | 12/1995 | Sakari | 704/233 |
| 5,537,509 | 7/1996 | Swaminathan et al. | 704/228 |
| 5,630,016 | 5/1997 | Swaminathan et al. | 704/228 |
| 5,657,421 | 8/1997 | Lorenz et al. | 704/223 |

OTHER PUBLICATIONS

"GSM full-rate speech transcoding"; (ETSI/PT 12, GSM Recommendation 06.10, Jan. 1990), pp. 1–93.

"GSM full-rate speech transcoding"; (ETSI/PT 12, GSM Recommendation 06.31, Jan. 1990), pp. 1–13.

E. Masada; "Control Engineering"; Baifukan, Sep. 1985, pp. 180–182.

*Primary Examiner*—David R. Hudspeth
*Assistant Examiner*—Tālivaldis Ivars Šmits
*Attorney, Agent, or Firm*—Whitham, Curtis & Whitham

[57] ABSTRACT

In a speech decoding apparatus, a conversion unit converts a received encoded signal into a parameter in units of frames. A memory repeatedly updates and stores the parameter representing a pause state and output from the conversion unit for the pause interval of the speech signal. A synthesis filter coefficient generation unit generates a synthesis filter coefficient on the basis of the parameter read out from the memory. A smoothed filter coefficient generation unit generates a smoothed filter coefficient on the basis of the synthesis filter coefficient output from the synthesis filter coefficient generation unit. The smoothed filter coefficient generation unit generates the smoothed filter coefficient which is smoothed such that the synthesis filter coefficient changes in accordance with a count value of the frames during the predetermined period. A background noise generation unit generates background noise on the basis of the parameter read out from the memory for the pause interval of the speech signal. A smoothing filter performs filtering processing of the background noise output from the background noise generation unit by using the smoothed filter coefficient output from the smoothed filter coefficient unit and outputs smoothed background noise.

8 Claims, 4 Drawing Sheets

FRAME-COUNT-DEPENDENT SMOOTHING FILTER FOR REDUCING ABRUPT DECODER BACKGROUND NOISE VARIATION DURING SPEECH PAUSES IN VOX

BACKGROUND OF THE INVENTION

The present invention relates to a speech decoding apparatus for a speech encoding/decoding communication system which performs VOX (Voice Operated Transmission) control to stop transmission from a speech encoding apparatus for power saving upon determining that no signal to be transmitted is present.

A technique of this type is described in detail in "GSM full-rate speech transcoding" (ETSI/PT 12, GSM Recommendation 06.10, January 1990) (reference 1) or "GSM full-rate speech transcoding" (ETSI/PT 12, GSM Recommendation 06.31, January 1990) (reference 2). "DTX (Discontinuous Transmission)" described in reference 2 corresponds to the above-mentioned "VOX".

Generally, in digital communication using apparatuses for performing high-efficiency speech encoding/decoding, a speech signal is decomposed into units called "frames" of about 40 ms. The speech encoding apparatus extracts a "parameter" for characterizing the speech signal. When it is determined on the basis of the extracted parameter that the presently encoded frame represents an "interval in which a speech signal to be transmitted is present", i.e., a "speech state", the parameter is converted into a code string, and the code string is transmitted to the speech decoding apparatus.

When it is determined on the basis of the parameter that the presently encoded frame represents an "interval in which no speed signal to be transmitted is present", i.e., a "pause state", the speech encoding apparatus transmits a code string called a "postamble" representing the start of the pause state to the speech decoding apparatus. For the next frame, a code string is generated from the parameter representing the pause state, as for the speech state, and the code string is transmitted to the speech decoding apparatus (the code string transmitted subsequent to the postamble will be referred to as a "background noise updating code string" hereinafter). Thereafter, the speech encoding apparatus determines the pause and speech states in units of frames. As far as the pause state continues, transmission of code strings is stopped for N (N is a constant) frames. If it is determined that the pause state still continues after N frames, a postamble and a background noise updating code string are continuously transmitted, and transmission of code strings is stopped again for N frames.

As described above, the speech encoding apparatus determines the speech and pause states in units of frames. Upon determining a change from the pause state to the speech state, transmission of code strings to the speech decoding apparatus is restarted to perform processing for the speech state.

FIG. 5 shows the above-described conventional speech decoding apparatus which receives the code string of a speech signal from the speech encoding apparatus and decodes the code string. Referring to FIG. 5, reference numeral 1 denotes an input terminal; 2, a code string conversion unit; 3, a first parameter memory; 4, a second parameter memory; 5, a background noise parameter generation unit; 6, a synthesis filter coefficient generation unit; 7, an excitation signal generation unit; 10, a synthesis filter; 11 and 12, switches; and 16, an output terminal.

In the speech decoding apparatus with the above arrangement, the code string of a speech signal is received through the input terminal 1 and converted into a parameter by the code string conversion unit 2. It is determined on the basis of this parameter whether the presently encoded frame represents a speech or pause state. Determination information a is output to switches 11 and 12 to control switching of the switches 11 and 12.

In the speech state, the parameter converted by the code string conversion unit 2 is sent to the synthesis filter coefficient generation unit 6 and the excitation signal generation unit 7 through the switches 11 and 12. Upon receiving the parameter, the synthesis filter coefficient generation unit 6 generates a synthesis filter coefficient and outputs the synthesis filter coefficient to the synthesis filter 10. Upon receiving the parameter, the excitation signal generation unit 7 generates an excitation signal and outputs the excitation signal to the synthesis filter 10.

The synthesis filter 10 performs filtering processing of the received excitation signal and synthesis filter coefficient to generate a decoded speech signal and outputs the decoded speech signal from the output terminal 16. The parameter output from the code string conversion unit 2 is stored in the first parameter memory 3. The first parameter memory 3 is a FIFO (First-In-First-Out) type memory capable of storing parameters of one frame.

On the other hand, when it is determined on the basis of the parameter converted by the code string conversion unit 2 that the presently encoded frame represents a pause state, the speech decoding apparatus generates "background noise" with the following procedures. The background noise corresponds to "Comfortable Noise"0 described in reference 2.

The parameters stored in the second parameter memory 4 are read out and output to the background noise parameter generation unit 5. The background noise parameter generation unit 5 performs random number processing of some of the received parameters, and thereafter, outputs a background noise parameter for generating an excitation signal to the switch 12. At this time, since the switch 12 is switched in accordance with the determination information a, the excitation signal generating parameter is output to the excitation signal generation unit 7 through the switch 12.

The parameter read out from the parameter memory 4 is sent to the switch 11 and output to the synthesis filter coefficient generation unit 6 through the switch 11 switched in accordance with the determination information a. Note that, in the pause state, a parameter representing a speech state, which is output from the code string conversion unit 2, is not sent to the synthesis filter coefficient generation unit 6 and the excitation signal generation unit 7.

When the parameters are output from the parameter memory 4 and the background noise parameter generation unit 5 to the synthesis filter coefficient generation unit 6 and the excitation signal generation unit 7, respectively, the synthesis filter coefficient generation unit 6 and the excitation signal generation unit 7 generate a synthesis filter coefficient and an excitation signal on the basis of the received parameters and supply the synthesis filter coefficient and the excitation signal to the synthesis filter 10, respectively. The synthesis filter 10 receives the synthesis filter coefficient and the excitation signal, performs filtering processing to generate a coded speech signal, and outputs the coded speech signal as background noise.

The parameter memory 4 is a FIFO type memory capable of holding the parameters of one frame. In the pause state, the contents of the parameter memory 4 are updated in accordance with the parameters in the parameter memory 3 in units of M (M is a constant) frames (the updating interval, i.e., "M frames" of the parameter memory 4 will be referred to as a "background noise updating period" hereinafter). In the speech state, the contents of the parameter memory 4 are not updated. When the above background noise updating code string is received in the pause state, it is converted into a parameter by the code string conversion unit 2 and stored in the parameter memory 3.

When the pause state continues, background noise generated in the conventional apparatus pauses the following problems. As the first problem, since the contents of the parameter memory 4 are not updated during the background noise updating period, a sound is continuously output as background noise with the quality being kept unchanged. As the second problem, when the contents of the parameter memory 4 are suddenly updated after M frames, the sound quality of the background noise abruptly varies. For this reason, unnatural background noise whose sound quality abruptly varies in units of M frames is received by a receiver on the speech decoding apparatus side.

SUMMARY OF THE INVENTION

It is an object of the present invention to provide a speech decoding apparatus which inhibits transmission of unnatural background noise when a pause state continues.

In order to achieve the above object, according to the present invention, there is provided a speech decoding apparatus connected to a speech encoding apparatus which divides a speech signal into a plurality of frames, encodes a parameter in units of frames, stops a transmission output when the speech signal represents a pause state, and transmits an encoded signal representing the pause state in units of frames having a predetermined period for a pause interval, comprising conversion means for converting the received encoded signal into the parameter in units of frames, memory means for repeatedly updating and storing the parameter representing the pause state and output from the conversion means for the pause interval of the speech signal, synthesis filter coefficient generation means for generating a synthesis filter coefficient on the basis of the parameter read out from the memory means, smoothed filter coefficient generation means for generating a smoothed filter coefficient on the basis of the synthesis filter coefficient output from the synthesis filter coefficient generation means, the smoothed filter coefficient generation means generating the smoothed filter coefficient which is smoothed such that the synthesis filter coefficient changes in accordance with a count value of the frames during the predetermined period, background noise generation means for generating background noise on the basis of the parameter read out from the memory means for the pause interval of the speech signal, and smoothing filter means for performing filtering processing of the background noise output from the background noise generation means by using the smoothed filter coefficient output from the smoothed filter coefficient means and outputting smoothed background noise.

BRIEF DESCRIPTION OF THE DRAWINGS

FIGS. 4A to 4E are graphs showing the frequency spectra of background noise output in a pause state, in which FIGS. 4A, 4C, and 4D show cases wherein a smoothing filter with strong inverse characteristics is used, and FIGS. 4B and 4E show cases wherein a smoothing filter with weak inverse characteristics is used.

DESCRIPTION OF THE PREFERRED EMBODIMENT

The present invention will be described below with reference to the accompanying drawings.

Figure 1:
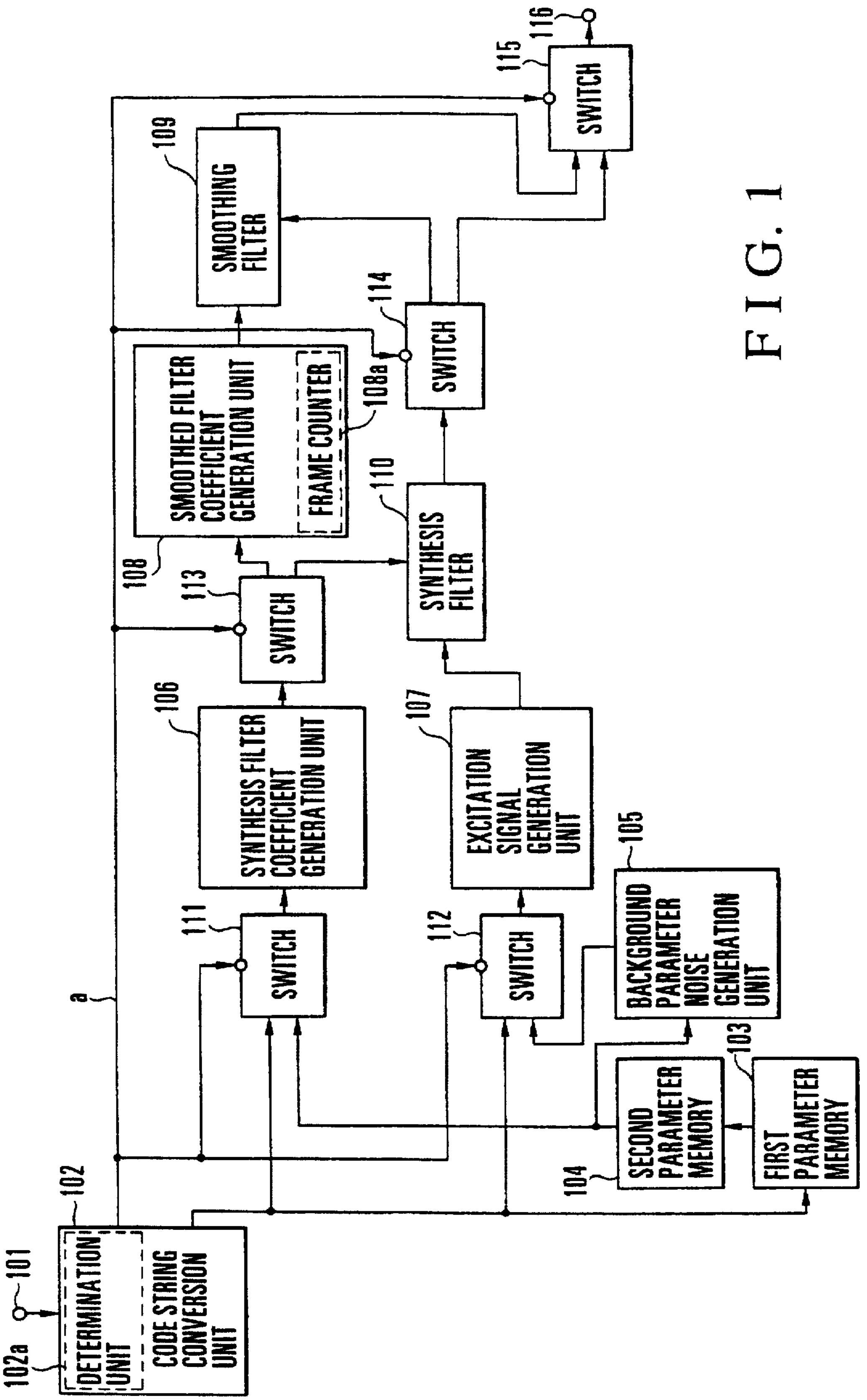
FIG. 1 is a block diagram showing a speech decoding apparatus according to an embodiment of the present invention.

FIG. 1 shows a speech decoding apparatus according to an embodiment of the present invention. Referring to FIG. 1, a code string conversion unit 102 converts the code string of a speech signal input to an input terminal 101 into a parameter. The code string conversion unit 102 has a determination unit 102*a* for determining on the basis of the parameter whether the speech signal represents a pause or speech state and outputting determination information a. A first parameter memory 103 stores the parameter output from the code string conversion unit 102. A second parameter memory 104 stores the parameter transferred from the first parameter memory 103 only when the parameter stored in the first parameter memory 103 represents a pause state. A background noise parameter generation unit 105 generates a background noise parameter on the basis of the parameter read out from the second parameter memory 104. A synthesis filter coefficient generation unit 106 generates a synthesis coefficient on the basis of the parameter output from the code string conversion unit 102 and the parameter read out from the parameter memory 104. An excitation signal generation unit 107 generates an excitation signal on the basis of the parameter output from the code string conversion unit 102 and the background noise parameter output from the background noise parameter generation unit 105.

A smoothed filter coefficient generation unit 108 generates a filter coefficient discussed in further detail below and including "inverse characteristics of the synthesis filter coefficient generated by the synthesis filter coefficient generation unit 106" having "specific characteristics on a frequency spectrum" in units of frames in correspondence with the synthesis filter coefficient generated by the synthesis filter coefficient generation unit 106. The filter coefficient generated by the smoothed filter coefficient generation unit 108 will be referred to as a "smoothed filter coefficient" hereinafter. With filtering processing using this smoothed filter coefficient, control is performed such that the difference in the frequency spectrum envelope of the decoded speech signal (background noise) output from an output terminal 116 for frames before and after updating of the second parameter memory 104 is minimized. The smoothed filter coefficient generation unit 108 has a frame counter 108*a* for counting the number of frames in the pause interval of the speech signal.

A smoothing filter 109 performs filtering processing of received background noise by using the smoothed coefficient obtained by the smoothed filter coefficient generation unit 108 and outputs smoothed background noise. The smoothed filter coefficient generation unit 108 and the smoothing filter 109 operate only in the pause interval of the speech signal in accordance with the determination information a output from the code string conversion unit 102. Switches 113 to 115 are switched for the speech and pause intervals of the speech signal in accordance with the determination information a output from the code string conversion unit 102. A synthesis filter 110 performs filtering processing of the excitation signal output from the excitation signal generation unit 107 by using the synthesis filter coefficient output from the synthesis filter coefficient generation unit 106.

Switches 111 to 115 are switched for the speech and pause intervals of the speech signal in accordance with the determination information a output from the code string conversion unit 102. The switch 111 selects the parameter from the code string conversion unit 102 or the parameter from the second parameter memory 104 and outputs the selected parameter to the synthesis filter coefficient generation unit 106. The switch 112 selects the parameter from the code string conversion unit 102 or the background noise parameter from the background noise parameter generation unit 105 and outputs the selected parameter to the excitation signal generation unit 107. The switch 113 outputs the synthesis filter coefficient from the synthesis filter coefficient generation unit 106 to only the synthesis filter 110 or both the smoothed filter coefficient generation unit 108 and the synthesis filter 110. The switch 114 switches an output from the synthesis filter 110 to the smoothed filter 109 or the switch 115. The switch 115 selects the output from the smoothing filter 109 or the output from the switch 114 and outputs the selected output to the output terminal 116.

The parameter memories 103 and 104 are FIFO type memories capable of holding parameters of one frame. Upon receiving a background noise updating code string in the pause state, the parameter memory 103 stores a parameter representing the pause state, which is converted by the code string conversion unit 102. The parameter memory 104 is updated in accordance with the parameter in the parameter memory 103 in the pause state in units of M frames and not updated in the speech state.

An operation performed when the code string of a speech signal is input from a speech encoding apparatus for performing VOX control will be described below.

Figure 5:
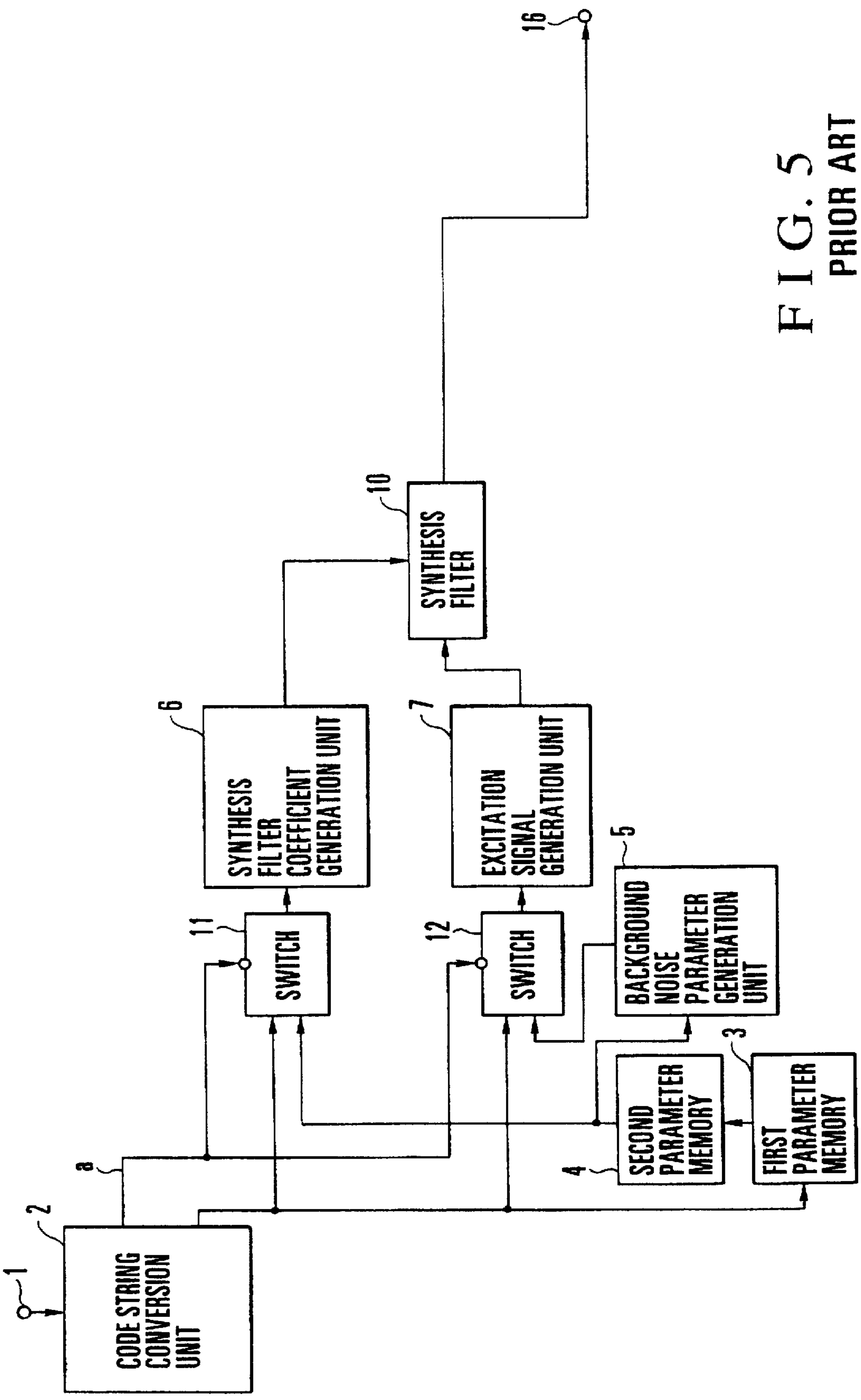
F I G. 5 PRIOR ART
FIG. 5 is a block diagram showing a conventional speech decoding apparatus.

Processing performed when the speech signal received from the input terminal 101 represents a speech state is the same as that of the conventional apparatus shown in FIG. 5 except that switching of the switches 113 to 115 in accordance with the speech and pause states is added. More specifically, the parameter converted by the code string conversion unit 102 from the code string in the speech state is output to the synthesis filter coefficient generation unit 106 and the excitation signal generation unit 107 through the switches 111 and 112 switched in accordance with the determination information a. The synthesis filter coefficient generation unit 106 and the excitation signal generation unit 107 generate a synthesis filter coefficient and an excitation signal on the basis of the received parameters, respectively. At this time, the parameter output from the code string conversion unit 102 is stored in the first parameter memory 103.

The synthesis filter coefficient generated by the synthesis filter coefficient generation unit 106 is output to the synthesis filter 110 through the switch 113 which is switched in accordance with the determination information a. The synthesis filter 110 performs filtering processing of the excitation signal generated by the excitation signal generation unit 107 by using the synthesis filter coefficient from the synthesis filter coefficient generation unit 106. An output from the synthesis filter 110 is output from the output terminal 116 as a decoded speech signal through the switches 114 and 115 switched in accordance with the determination information a.

On the other hand, when the speech signal input from the input terminal 101 represents a pause state, the parameter converted by the code string conversion unit 102 and representing the pause state is stored in the first parameter memory 103. Since the parameter stored in the first parameter memory 103 represents the pause state, the parameter is transferred to the second parameter memory 104, updated, and stored. The parameters stored in the second parameter memory 104 are read out and output to the background noise parameter generation unit 105. The background noise parameter generation unit 105 performs random number processing of some of the received parameters, and thereafter, outputs a background noise parameter for generating an excitation signal. The background noise parameter from the background noise parameter generation unit 105 is sent to the excitation signal generation unit 107 through the switch 112 switched in accordance with the determination information a. The excitation signal generation unit 107 generates an excitation signal on the basis of the received background noise parameter and outputs the excitation signal to the synthesis filter 110.

The parameter stored in the second parameter memory 104 and representing the pause state is also used to generate a synthesis filter coefficient. More specifically, the parameter read out from the second parameter memory 104 is output to the synthesis filter coefficient generation unit 106 through the switch 111 switched in accordance with the determination information a to generate a synthesis filter coefficient. The synthesis filter coefficient generated by the synthesis filter coefficient generation unit 106 is output to the synthesis filter 110 and the smoothed filter coefficient generation unit 108 through the switch 113 switched in accordance with the determination information a.

The synthesis filter 110 performs filtering processing of the excitation signal from the excitation signal generation unit 107 by using the received synthesis filter coefficient and outputs the background noise to the switch 114. The smoothed filter coefficient generation unit 108 generates a smoothed filter coefficient "having specific characteristics on a frequency spectrum" on the basis of the received synthesis filter coefficient in units of frames and outputs the smoothed filter coefficient to the smoothing filter 109.

Upon receiving the background noise from the synthesis filter 110 through the switch 114 switched on the basis of the determination information a, the smoothing filter 109 performs filtering processing using the smoothed filter coefficient output from the smoothed filter coefficient generation unit 108, thereby outputting smoothed background noise. The smoothed background noise is output from the output terminal 116 through the switch 115 switched on the basis of the determination information a.

Since the second parameter memory 104 is not updated in the speech state, the background noise may be generated using a parameter which has been lastly stored for a pause interval immediately before switching from the speech state to the pause state.

The functions of the smoothed filter coefficient generation unit 108 and the smoothing filter 109 will be described below in detail.

For example, a value H(z) of the synthesis filter is represented by an all pole type filter of degree of n like equation (1) by using z-transform:

$$H(z)=\frac{1}{1-\sum_{i=1}^{n}\alpha_i\cdot z^{-i}} \qquad (1)$$

where n is a predetermined constant, and $\alpha_i$ is a synthesis filter coefficient. Such z-transform is described in, e.g., Eisuke Masada, "Control Engineering", Baifukan, Sept. 1985, pp. 180–182.

The "specific characteristics on the frequency spectrum" of the smoothed filter coefficient generated by the smoothed filter coefficient generation unit 108 are defined as the "inverse characteristics of the synthesis filter coefficient generated by the synthesis filter coefficient generation unit 106".

Figure 2:
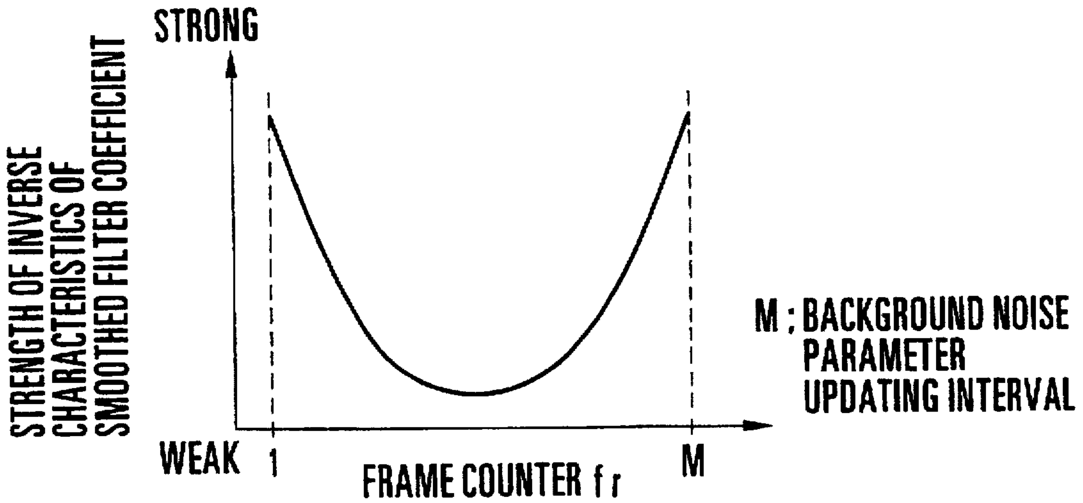
FIG. 2 is a graph showing the relationship between the strength of the inverse characteristics of a smoothed filter coefficient and the value of a frame counter.

The strength of the inverse characteristics of the smoothed filter coefficient is controlled as shown in FIG. 2 in accordance with a value fr (fr=1 to M) of the frame counter 108a after the contents of the second parameter memory 104 are updated.

The value fr of the frame counter 108a is initialized to be "1" when the contents of the second parameter memory 104 are updated. When the pause state continues, the value fr is incremented by "1" for each frame. After M frames, the value fr is initialized to be "1" again, so that the inverse characteristics of the smoothed filter coefficient is controlled to be strong at the time of updating of the second parameter memory 104 and weak at other points of time.

A smoothed filter coefficient βi(fr) (i=1 to n) representing the inverse characteristics and an output value R(z) from the smoothing filter 109 can be calculated using equations (2) and (3), respectively:

$$\beta_i(fr)=\alpha_i\cdot\lambda(fr)^i\ (i=1\sim n) \qquad (2)$$

$$R(z,fr)=1-\sum_{i=1}^{n}\beta_i(fr)\cdot z^{-i} \qquad (3)$$

Figure 3:
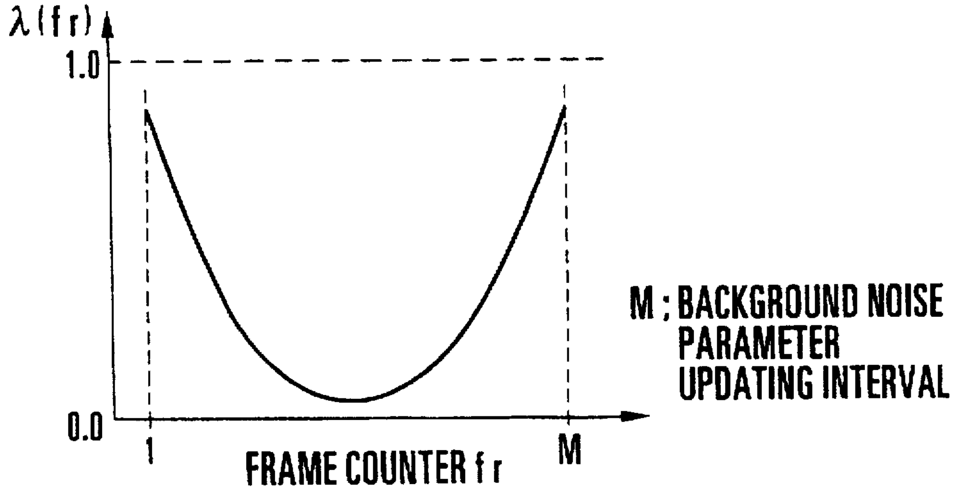
FIG. 3 is a graph showing the relationship between the value of the frame counter and a factor λ for generating the smoothed filter coefficient.

A factor λ(fr) of equation (2) satisfies 0≦λ(fr)<1, as shown in FIG. 3, and changes in accordance with the value fr of the frame counter 108a.

Figures 4A, 4B, 4C, 4D, 4E:
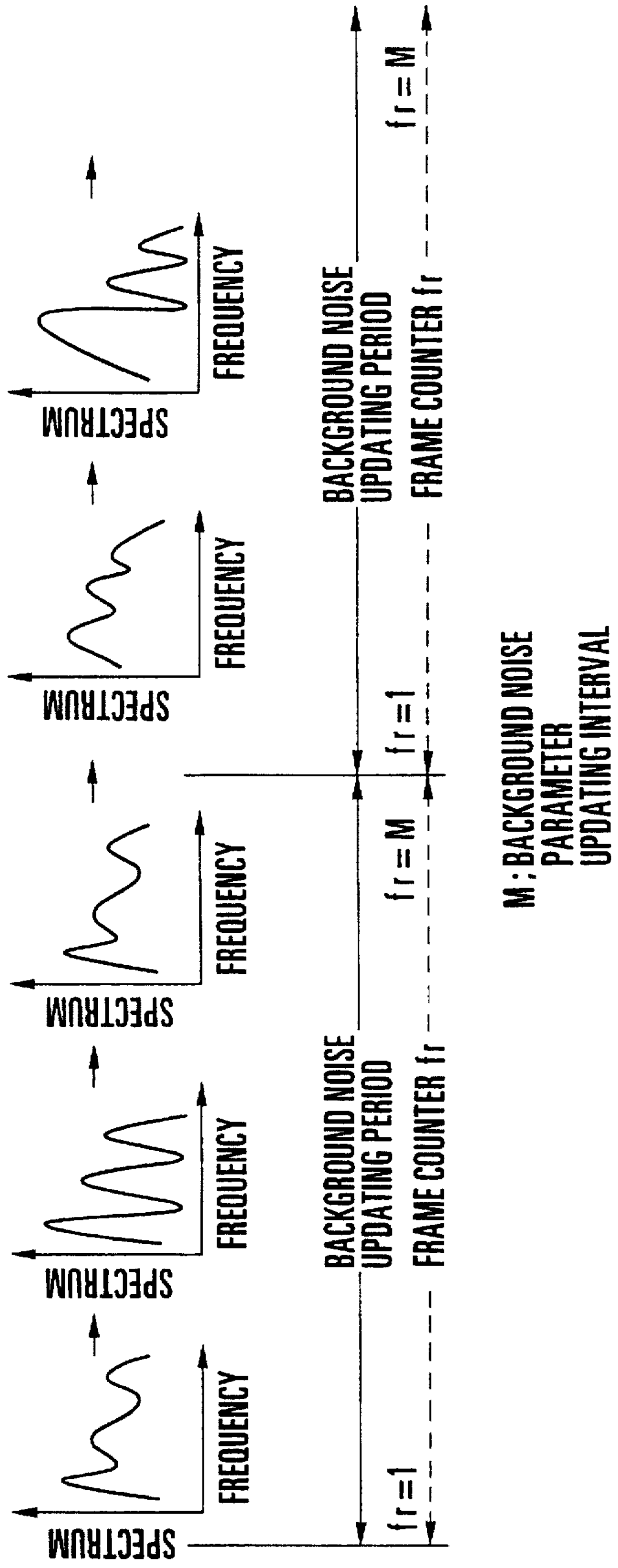

FIGS. 4A to 4E show the frequency spectrum characteristics of background noise for a pause interval in use of the smoothing filter 109. When the value fr of the frame counter is near "1" or "M", filtering processing of background noise is performed using a smoothed filter coefficient with strong inverse characteristics, as shown in FIGS. 4A, 4C, and 4D. When the value fr of the frame counter is at an intermediate point between "1" and "M", filtering processing of background noise is performed using a smoothed filter coefficient with weak inverse characteristics, as shown in FIGS. 4B and 4E. With this processing, as shown in FIGS. 4A to 4C, the frequency spectrum of background noise changes at each point of time within one background noise updating period. For this reason, background noise with the sound quality being kept unchanged for M frames can be prevented from being received by a receiver on the decoding apparatus side.

After the contents of the second parameter memory 104 are updated, i.e., when the value fr of the frame counter 108a is near "1" or "M", filtering processing of background noise is performed using a smoothed filter coefficient with strong inverse characteristics, as shown in FIGS. 4A, 4C, and 4D, so that the frequency spectrum of the background noise exhibits relatively flat characteristics. Therefore, the receiver can hardly sense an abrupt change in sound quality upon updating the parameter.

As has been described above, according to the present invention, in a speech encoding/decoding system which performs VOX control to stop transmission from the encoding apparatus for power saving, the smoothed filter coefficient generation unit 108 and the smoothing filter 109 are arranged in the speech decoding apparatus. With this arrangement, even when the pause state continues, the sense of incompatibility or unnaturalness in background noise received by the receiver can be reduced.

What is claimed is:

1. A speech decoding apparatus connected to a speech encoding apparatus which divides a speech signal into a plurality of frames, encodes a parameter in units of frames, stops transmission output when the speech signal represents a pause state, and transmits an encoded signal representing the pause state in units of frames having a predetermined period for a pause interval, comprising:

conversion means for converting the received encoded signal into the parameter in units of frames;

memory means for repeatedly updating and storing the parameter representing the pause state and output from said conversion means for the pause interval of the speech signal;

synthesis filter coefficient generation means for generating a synthesis filter coefficient on the basis of the parameter read out from said memory means;

smoothed filter coefficient generation means for generating a smoothed filter coefficient on the basis of the synthesis filter coefficient output from said synthesis filter coefficient generation means, said smoothed filter coefficient generation means generating the smoothed filter coefficient which is smoothed such that the smoothing filter coefficient changes in accordance with a count value of said frames during the predetermined period;

background noise generation means for generating background noise on the basis of the parameter read out from said memory means for the pause interval of the speech signal; and smoothing filter means for performing filtering processing of the background noise output from said background noise generation means by using the smoothed filter coefficient output from said smoothed filter coefficient means and outputting smoothed background noise.

2. An apparatus according to claim 1, wherein said smoothed filter coefficient means generates the smoothed filter coefficient such that a difference is reduced in a frequency spectrum envelope of the background noise output from said background noise generation means before and after the parameter stored in said memory means is updated for the pause interval of the speech signal.

3. An apparatus according to claim 1, wherein said smoothed filter coefficient generation means comprises count means for counting the number of frames for the pause interval of the speech signal, said count means being reset every time the parameter stored in said memory means is updated, and said smoothed filter coefficient generation means controls the strength of characteristics of the smoothed filter coefficient on the basis of a count value of said count means before and after the parameter is updated.

4. An apparatus according to claim 1, wherein said background noise generation means comprises background noise parameter generation means for performing random number processing of the parameter read out from said memory means to generate a background noise parameter, excitation signal generation means for generating an excitation signal in accordance with the background noise parameter output from said background noise parameter generation means, and synthesis filter means for performing filtering processing of the excitation signal output from said excitation signal by using the synthesis filter coefficient output from said synthesis filter coefficient generation means to output the background noise.

5. An apparatus according to claim 4, further comprising:

a first switch for receiving the parameter from said conversion means and the parameter read out from said memory means, selecting the parameter from said memory means for the pause interval of the speech signal, and outputting the parameter to said synthesis filter coefficient generation means;

a second switch for receiving the parameter from said conversion means and the background noise parameter from said background noise parameter generation means, selecting the background noise parameter for the pause interval of the speech signal, and outputting the background noise parameter to said excitation signal generation means;

a third switch for receiving the synthesis filter coefficient from said synthesis filter coefficient generation means, and switching and outputting the synthesis filter coefficient to both said smoothed filter coefficient generation means and said synthesis filter means for the pause interval of the speech signal;

a fourth switch for receiving an output from said synthesis filter means, and switching and outputting the background noise from said synthesis filter means to said smoothing filter means for the pause interval of the speech signal; and a fifth switch for receiving the smoothed background noise from said smoothing filter means and an output from said fourth switch, and selecting and outputting the smoothed background noise for the pause interval of the speech signal.

6. An apparatus according to claim 5, wherein, for a speech interval of the speech signal, said first switch selects the parameter from said conversion means and outputs the parameter to said synthesis filter coefficient generation means, said second switch selects the parameter from said conversion means and outputs the parameter to said excitation signal generation means, said third switch outputs the synthesis filter coefficient from said synthesis filter coefficient generation means only to said synthesis filter means, the fourth switch switches and outputs an output from said synthesis filter means to said fifth switch, and said fifth switch selects and outputs an output from said fourth switch.

7. An apparatus according to claim 5, wherein said conversion means comprises determination means for determining the speech or pause state of the speech signal in units of frames on the basis of the converted parameter and outputting determination information to said first to fifth switches.

8. An apparatus according to claim 1, wherein said memory means comprises a first-in-first-out type memory capable of holding parameters of one frame, and, in the pause state, contents of said memory are updated in accordance with the parameter representing the pause state, which is output from said conversion means in units of frames having the predetermined period, while the contents of said memory are not updated in the speech state.

* * * * *